United States Patent Office 3,410,147
Patented Nov. 12, 1968

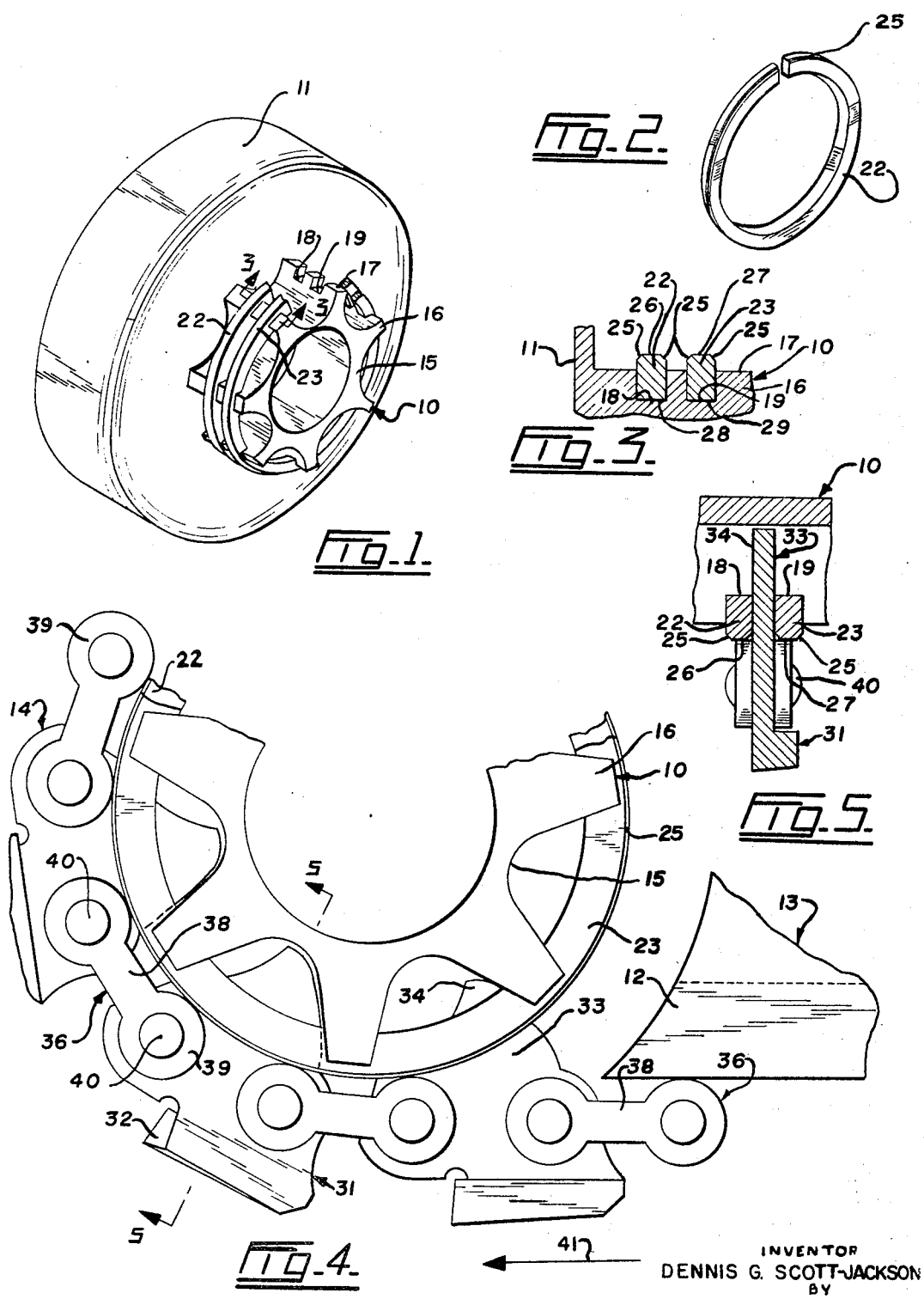

3,410,147
CHAIN SAW SPROCKET DRIVE ASSEMBLY
Dennis G. Scott-Jackson, Burnaby, British Columbia, Canada, assignor to Windsor Machine Company Limited, Burnaby, British Columbia, Canada
Filed June 12, 1967, Ser. No. 645,185
9 Claims. (Cl. 74—243)

ABSTRACT OF THE DISCLOSURE

A chain saw drive sprocket having split rings detachably mounted thereon in spaced apart relationship to serve as supporting flanges on which the connecting links of the saw chain ride.

BACKGROUND OF THE INVENTION

This invention relates to chain saws and in particular to the drive sprocket assemblies thereof.

The drive assembly of most chain saws includes a driven sprocket arranged at the heel of the chain saw cutter bar and over which the saw chain is passed with the drive tangs of the latter meshing with the teeth of the sprocket. The saw chain itself is generally formed having aligned central cutter teeth, the shanks of which are extended to form drive tangs, the shanks of adjacent cutter teeth being connected to one another by right and left spaced apart side straps rivetted thereto.

In order to prevent the sprocket teeth bottoming against the side straps and to prevent the tangs bottoming against the sprocket, it has been the practice to form, integrally with the sprocket, a pair of spaced apart circumferential flanges or runs which extends at their peripheral edges beyond the tips of the sprocket teeth so that when the saw chain is positioned, with the drive tangs extending between the flanges, the side straps will ride on the flanges preventing bottoming as aforesaid.

Although the provision of these flanges have prevented bottoming of the sprocket teeth and drive tangs, they are subject to rapid wear under the impact of the connecting links thereon owing to the fact that as they are non-rotatable relative to the sprocket wear occurs at fixed points. As these flanges wear the effective sprocket diameter is reduced which causes an off-pitch condition of the chain and sprocket resulting in severe wear of the chain tangs and sprocket teeth. This condition is aggravated as normal wear takes place on the side straps; and as the chain, due to rivet wear gradually lengthens, early replacement of the sprocket and very often the saw chain is required.

Flange equipped drive sprockets of prior art are also very difficult to machine and are therefore very costly, and the flanges create enclosed pockets which tend to collect wood chips and sawdust which materially affects proper engagement of the sprocket with the saw chain.

SUMMARY OF THE INVENTION

The present invention comprises a chain saw drive assembly for a saw chain having transversely spaced apart side straps and centrally located drive tangs, said assembly having a drive sprocket having pairs of spaced apart circumferentially extending peripheral grooves formed in the tips of the teeth thereof, and a pair of split rings formed of springy material slidably and removably fitted in the grooves so as to be rotatable relative to the sprocket, said split rings projecting radially outwardly of the periphery of the sprocket to form supporting flanges for the side straps of the saw chain.

The invention not only results in a material reduction of wear but when wear does occur and as the chain lengthens, permits the effective sprocket diameter to be altered accordingly without requiring replacement of the sprocket and chain.

The present invention also permits the sprocket to be machined in the normal manner and as the split rings are only engaged with the sprocket teeth at the tips thereof, they do not form enclosed pockets which might tend to collect sawdust or chips.

BRIEF DESCRIPTION OF THE DRAWINGS

FIGURE 1 is an isometric view of a chain sprocket in accordance with the invention with the split rings fitted thereon, FIGURE 2 is an isometric view of a split ring of this invention, FIGURE 3 is an enlarged sectional view of a portion of the invention taken along line 3—3 of FIGURE 1, FIGURE 4 is an enlarged partial side view of the invention and a portion of a saw chain and cutter bar, and FIGURE 5 is a sectional view of the invention taken along line 5—5 of FIGURE 4.

DESCRIPTION OF THE PREFERRED EMBODIMENT

There is illustrated in FIGURE 1, a chain saw drive sprocket 10 which is non-rotatably mounted on a driving member 11, the latter being rotatably driven by conventional means, not shown, from a chain saw engine, not shown. The sprocket 10 is conventionally located at the tail end 12 of a conventional cutter bar 13 over which a saw chain 14 passes, the chain being in meshing engagement with the sprocket 10.

The sprocket 10 is commonly machined from a solid cylindrical shaft around which a plurality of equidistantly spaced apart longitudinally extending grooves 15 are formed to form a plurality of radially extending teeth 16. These teeth have broad tips 17, and formed in the tip of each tooth are a pair of spaced apart circumferentially extending peripheral grooves 18 and 19, said grooves being substantially rectangular in cross section, the depth of said grooves 18 and 19 being substantially less than the height of the teeth 16.

Fitting in the grooves 18 and 19 are a pair of split rings 22 and 23, respectively, one of these rings, namely ring 22, being illustrated isometrically in FIGURE 2 and both rings being shown in cross section in FIGURES 3 and 5. Both rings are rectangular in cross section and are only slightly less in width than the width of the grooves 18 and 19 in which they fit. The inside diameter of the rings are a little greater than the diameter of an imaginary circle upon which the bottoms of the grooves lie so that the rings have a snug yet slidable fit within said grooves 18 and 19, and are therefore rotatable relative to the sprocket 10. The rings are chamfered at their outer peripheral edges 25 and are preferably formed of spring steel, the peripheral surfaces 26 and 27 of said rings 22 and 23, respectively, being chrome plated to provide hard abrasive-resistant wearing surfaces.

The radial width of these rings 22 and 23 measured between their inner surfaces 28 and 29, respectively, and their outer or peripheral surfaces 26 and 27 is slightly greater than the depth of the grooves 18 and 19 so that their said peripheral surfaces extend outwardly of the tips 17 of the teeth 16. Furthermore, as the depth of the grooves 18 and 19 is substantially less than the height of the teeth 16, the rings extend, unsupported, between adjacent teeth.

The saw chain 14 which is used with the drive sprocket assembly of the present invention is of a conventional type (see FIGURES 4 and 5) having cutter teeth 31 provided with chisels 32 extending from shanks 33, the shanks 33 being elongated to form drive tangs 34, the latter being shaped so that they may fittedly extend between adjacent teeth 16 of the sprocket for engagement with the latter. The cutter teeth are generally formed of flat metal stock and, in the present invention, the thickness of the stock forming the tangs 34 determines the spacing between the grooves 18 and 19 and thus the spacing between the rings 22 and 23. It is essential for a proper operation of the drive assembly that the rings 22 and 23 shall be spaced apart a distance only slightly greater than the thickness of the tangs.

The cutter teeth 31 are interconnected by means of side straps 36. These side straps are arranged in side by side relationship sandwiching the shanks 33 of the cutter teeth between them. These side straps are preferably formed of short lengths of flat steel stock, each link having a narrow central portion 38 and enlarged end portions 39 through which rivets 40 are extended.

It will be seen by referring to FIGURES 4 and 5 that as the peripheral surfaces 26 and 27 of rings 22 and 23 extend above the tips 17 of the sprocket teeth, they act as supporting flanges for the side straps 36 so as to prevent bottoming of the tangs against the sprocket and also bottoming of the sprocket teeth against the side straps. Furthermore, the side straps between any adjacent pair of cutting links will extend across a sprocket tooth so that the end portions 39 of these cutting links will bear upon the unsupported lengths of the rings 22 and 23 which extend between adjacent teeth.

The chamfered edges 25 of the rings 22 and 23 serve to guide the tangs 34 of the cutter teeth between the rings so as to prevent accidental impact of said tangs against the peripheral surfaces 26 and 27 of said rings.

Proper operation of the chain saw necessitates a relatively high linear velocity of the saw chain, consequently, the impact of the side straps, as they pass from the cutter bar 13 on to the sprocket 10 in the direction as shown by the arrow 41 upon the rings 22 and 23, will invariably result in certain amount of wear of these rings. However, as these rings 22 and 23 are not formed as an ingral part of the sprocket, the impact of the side straps thereon will cause them to rotatably creep relative to the sprocket so that their peripheral surfaces 26 and 27 wear uniformly rather than at localized points, thereby extending the life of the rings over conventional flanges or rims which are, in the prior art, integrally formed with the sprocket.

In the event the wear of the rings together with and lengthening of the chain results in an off-pitch condition of the chain and sprocket, this condition can quite easily be remedied by simply replacing the worn rings with new rings, the outside diameter of which is calculated to increase the effective sprocket diameter sufficiently to compensate for the increase in chain pitch.

It will be seen that as the rings are not an integral part of the sprocket, the latter may be easily machined in the conventional manner which would otherwise not be so if the rings were to constitute an integral part thereof. Furthermore, as the rings are resilient and as they are unsupported between teeth, they provide a little "give" under the impact of the connecting links thereon but do not form enclosed pockets for entrapment of foreign material, such as wood chips and the like.

I claim:
1. In a chain saw drive assembly for driving a saw chain having centrally located aligned drive tangs and spaced apart side straps, the improvement comprising a chain drive sprocket having axially elongated teeth, each of said teeth having a pair of spaced apart circumferentially extending peripheral grooves formed in its tip, and a pair of split rings seated in the grooves to serve as supporting flanges for the side straps of the chain while permitting the drive tangs thereof to extend radially inwardly between the flanges and between adjacent teeth.

2. The improvement as claimed in claim 1 in which the radial width of each of the rings is greater than the depth of each of the grooves so that the rings extend radially beyond the tips of the teeth.

3. The improvement as claimed in claim 1 in which the split rings are rectangular in cross section and are chamfered at their peripheral edges so as to provide guide surfaces for slidably guiding the drive tangs of the chain therebetween.

4. The improvement as claimed in claim 1 in which the split rings are formed of springy material so as to permit them to be sprung over the sprocket into and out of the grooves.

5. The improvement as claimed in claim 4 in which the depth of each of the grooves is less than the radial length of each of the sprocket teeth so that the split rings extend unsupported between adjacent sprocket teeth.

6. The improvement as claimed in claim 4 in which the split rings have a snug but slidable fit within the grooves so as to be rotatable relative to the sprocket.

7. The improvement as claimed in claim 4 in which the rings are formed of spring steel and have chrome surfaced peripheral surfaces.

8. The improvement as claimed in claim 4 in which the radial width of each of the rings is greater than the depth of each of the grooves so that the rings extend radially beyond the tips of the teeth.

9. The improvement as claimed in claim 4 in which the split rings are rectangular in cross section and are chamfered at their peripheral edges so as to provide guide surfaces for slidably guiding the drive tangs of the chain therebetween.

References Cited

UNITED STATES PATENTS

| | | | |
|---|---|---|---|
| 3,135,127 | 6/1964 | Reed | 74—243 |
| 3,163,052 | 12/1964 | Oehrli et al. | 74—243 XR |

FRED C. MATTERN, Jr., *Primary Examiner.*

J. A. WONG, *Assistant Examiner.*